(12) United States Patent
Gong et al.

(10) Patent No.: US 11,809,282 B2
(45) Date of Patent: Nov. 7, 2023

(54) OPTIMIZED PIPELINE TO BOOST DE-DUP SYSTEM PERFORMANCE

(71) Applicant: EMC IP Holding Company LLC, Hopkinton, MA (US)

(72) Inventors: Shuguang Gong, Beijing (CN); Yong Zou, San Jose, CA (US); Jet Chen, Beijing (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 100 days.

(21) Appl. No.: 17/037,336

(22) Filed: Sep. 29, 2020

(65) Prior Publication Data
US 2022/0100612 A1   Mar. 31, 2022

(51) Int. Cl.
*G06F 11/14* (2006.01)
*G06F 3/06* (2006.01)

(52) U.S. Cl.
CPC ........ *G06F 11/1453* (2013.01); *G06F 3/0608* (2013.01); *G06F 3/0611* (2013.01); *G06F 3/0619* (2013.01); *G06F 3/0641* (2013.01); *G06F 3/0656* (2013.01); *G06F 3/0688* (2013.01); *G06F 3/0689* (2013.01); *G06F 2201/84* (2013.01)

(58) Field of Classification Search
CPC ........ G06F 3/06; G06F 11/14; G06F 11/1453; G06F 3/0608; G06F 3/0611; G06F 3/0619; G06F 3/0641; G06F 3/0656; G06F 3/0688; G06F 3/0689; G06F 2201/84
USPC .......................................................... 711/113
See application file for complete search history.

(56) References Cited

U.S. PATENT DOCUMENTS

| 8,266,496 | B2* | 9/2012 | Flynn ................... G06F 3/0604 |
| | | | 714/758 |
| 2003/0061457 | A1* | 3/2003 | Geiger ................... G06F 12/08 |
| | | | 711/165 |
| 2008/0141043 | A1* | 6/2008 | Flynn ..................... G06F 1/183 |
| | | | 711/E12.04 |
| 2011/0055471 | A1* | 3/2011 | Thatcher ............... G06F 3/0608 |
| | | | 711/114 |
| 2016/0266846 | A1* | 9/2016 | Horiguchi ............. G06F 3/0659 |
| 2019/0042443 | A1* | 2/2019 | Maciejewski ....... G06F 12/0871 |
| 2020/0241778 | A1* | 7/2020 | Bassov ............... G06F 12/0862 |

OTHER PUBLICATIONS

Kennedy, Patrick. Intel QuickAssist Technology and OpenSSL—Benchmarks and Setup Tips (Oct. 18, 2016) (Year: 2016).*
Ilyas, Ihab; Chu, Xu. Data Cleaning, Association for Computing Machinery. (New York, 2019) (Year: 2019).*

* cited by examiner

*Primary Examiner* — Michael Krofcheck
(74) *Attorney, Agent, or Firm* — WOMBLE BOND DICKINSON (US) LLP

(57) ABSTRACT

A deduplication pipeline method to enable shorter overall latency, servicing of multiple calls in parallel, and implementing higher data compression ratio. The method includes receiving user data for storage, performing deduplication operation on the data to obtain non-duplicative data, buffering the non-duplicative data in persistent memory, and accepting next user data for deduplication processing. In parallel to receiving the next user data, operating a co-processor to asynchronously compress the data stored in the persistent memory and storing the compressed data in RAID.

20 Claims, 3 Drawing Sheets

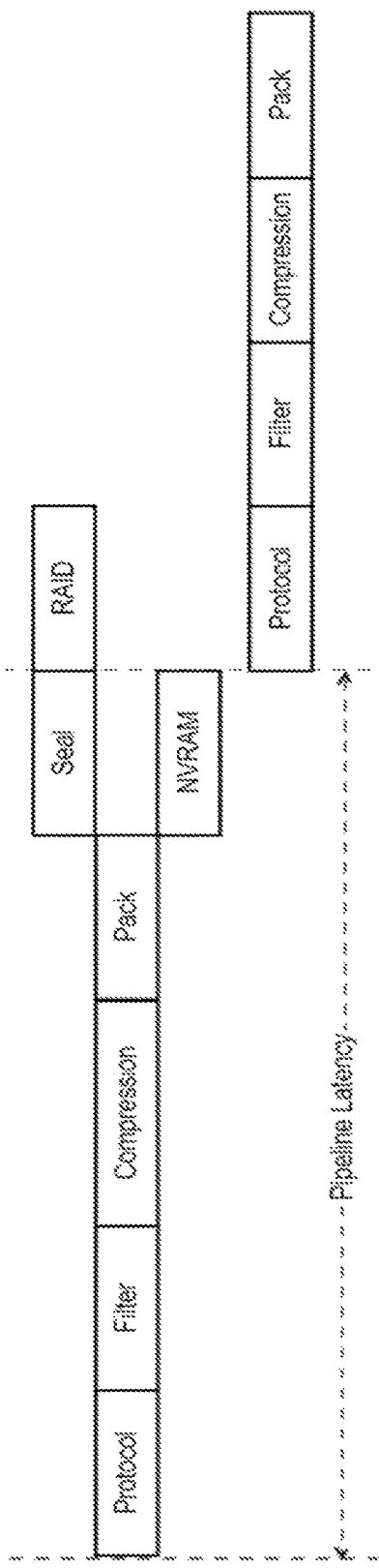
*Figure 1 – Prior Art*
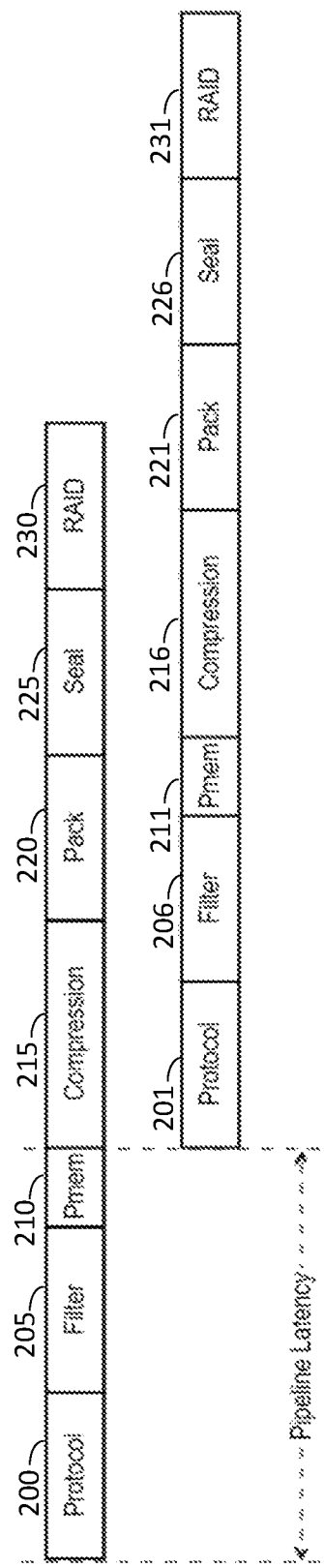
*Figure 2*

OPTIMIZED PIPELINE TO BOOST DE-DUP SYSTEM PERFORMANCE

TECHNICAL FIELD

This disclosure relates to data storage and, more specifically, to improvements in the de-duplication process for data storage.

BACKGROUND

Deduplication (de-dup) is used in data storage systems to improve storage utilization and network load by reducing the amount of data to be sent and stored for backup. Storage utilization efficiency is further improved by compression algorithm applied to the de-duped data prior to storage. In implementing the de-dup pipeline, a compromise must be made in selecting processes that result in less data to save, but having longer latency due to compute operations. For example, higher compression ratios generate less data to be saved, but requires more processing time.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

FIG. 1 is a schematic illustrating a pipeline of a deduplication process according to the prior art.

FIG. 2 is a schematic illustrating a pipeline of a deduplication process according to an embodiment.

DETAILED DESCRIPTION

Figure 3:
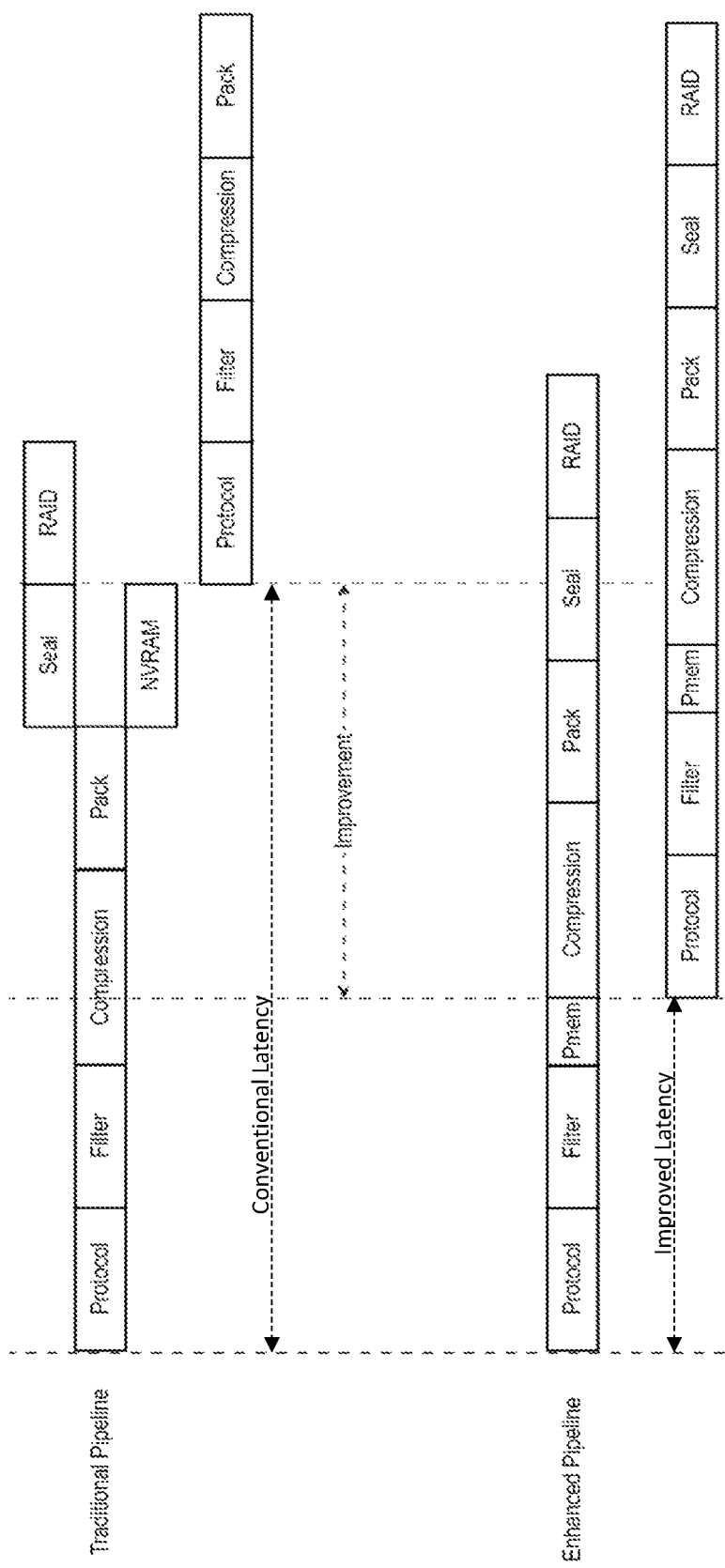
FIG. 3 is a schematic illustrating the latency saving resulting from the deduplication pipeline according to an embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

Aspects of this disclosure include methodologies to improve the overall latency of the de-dup pipeline. According to disclosed aspects, the CPU is removed from being a bottleneck by offloading the compression process to a co-processor, such as QAT (QuickAssist Technology) or similar hardware accelerators. Additionally, in order to account for the latency of the compression operation, the pipeline is reorganized such that uncompressed data is stored in PMEM (Persistent Memory), so that the process may start the next batch of de-dup while the co-processor compresses the data stored in the PMEM. To better present the features and concepts, the following first presents the standard de-dup pipeline and its operation and then presents embodiments of the new pipeline and its advantages over the standard pipeline.

The design of standard de-dup pipelines is based on the traditional hardware platforms where CPU takes on all computing works for deduplication and NVRAM (Nonvolatile random-access memory) provides non-volatile data buffering for data integrity. As illustrated in FIG. 1, generally the de-dup pipeline can be divided into several parts: protocol layer, filtering, compression, packing, sealing, and data persistence. The protocol layer is responsible for dealing with data transfer protocols which data from client software is sending through. Filtering is a process of eliminating duplicated data on data segment (or chinks) basis. Compression is a computing-intensive and time-consuming job performed by CPU in most systems to compressed the non-duplicative data remaining after the filtering process. Packing and sealing is to organize the compressed data in favor of data persistence, e.g., organizing the data in RAID array level data chunks. Data persistence is to store relevant data into NVRAM for buffering and into RAID for persistence. NVRAM combined with RAID is a de facto industrial standard approach for data persistence.

In most cases, de-dup pipeline works under a stable protocol, such stable write in NFS (Network File System). Therefore, as illustrated in FIG. 1, the protocol layer will stall until the compressed data has been buffered into NVRAM. That is, in order to shorten the overall pipeline latency, rather than storing the compressed and packed data directly onto the RAID, which would take long time, the compressed and packed data is temporarily buffered in the NVRAM to enable the system to accept another batch of user data. In parallel of processing the next batch, the data is transferred from the NVRAM to the RAID. This existing design fits the legacy platforms, having the CPU as the only processor and NVRAM in a form factor of a PCIe (peripheral component interconnect express) device.

While the standard pipeline has been operable for legacy systems, it presents the following difficulties. Since NVRAM is designed as a complex PCI device that needs to be accessed as a block device, it requires a deep software stack for write operations. Due to the limited PCI bus bandwidth and deep stack, the NVRAM performance could become a bottleneck in some circumstances, prolonging the overall pipeline latency. Also, since the compression layer is part of the overall pipeline latency, compression latency will impact the performance of the overall de-dup pipeline latency. Consequently, improving the compression ratio to reduce the amount of data to buffer will increase the compression latency and thereby degrade the overall pipeline latency. Thus, if compression ratio is increased to reduce the amount of data saved to the NVRAM the compression becomes the bottleneck. Conversely, if compression ratio is reduced, then NVRAM may become the bottleneck due to increased amount of data to buffer.

The capacity of new PMEM NVRAM is much larger than existing PCIe NVRAM. Consequently, it is possible to reduce compression latency by using lower compression ratio and store less compressed data in the PMEM NVRAM. However, in such a case while the compression latency may decrease, the latency of the writing operation may increase as there's more data to write to the PMEM NVRAM.

Also, it is possible to use the co-processor, e.g., QAT, for the compression operation, thereby potentially enabling higher compression ratio. However, in such a case compression and writing remain part of the overall latency.

In consideration of the above, the inventors have observed that the traditional de-dup pipeline cannot take full advantage of the new hardware technologies, such as QAT and PMEM NVRAM. Thus, in order to fully utilize the benefits afforded by new hardware technologies, the inventors have devised new de-dup pipeline and process, embodiments of which are described below.

FIG. 2 illustrates an embodiment of a new de-dup pipeline that can take full advantage of improved memory and compute technologies. In this embodiment, two main mechanisms are utilized in order to drastically reduce the de-dup pipeline latency. First, compression is offloaded to the co-processor/accelerator, e.g., QAT. Second, since PMEM NVRAM has much larger memory space and a faster write operation, the order of writing to memory and compression is reversed: data is first written to memory uncompressed, and thereafter QAT performs compression. Thus, once writing to the PMEM NVRAM is completed, processing for a new pipeline can began, while in parallel QAT performs the compression of the previously written uncompressed data. As a result, compression latency is removed from the overall de-dup pipeline latency.

As illustrated in FIG. 2, in this embodiment a first pipeline is processed by processing the data transfer protocol at 200. Then at 205 the de-dup filtering is executed by the CPU. At 210 any resulting data that needs to be stored is buffered to the PMEM NVRAM uncompressed. Notably, as will be elaborated further below, in this embodiment the writing operation is performed using direct access (DAX), rather than using block access via conventional PCI stack. By using PMEM NVRAM in direct access mode, larger amount of data can be buffered due to the increased capacity of PMEM as compared to the standard NVRAM. Additionally, the data can be written much faster using direct access than using the PCIe block write access. When the write operation is completed, at 201 the operation is acknowledged to the client and the system is ready for protocol processing of the next batch of data. At 215, while the CPU process protocol and filtering of the next batch, the co-processor/QAT performs compression on the prior batch. At 220 the compressed data is packed to RAID level chunks and is sealed at 225. Here, since the processing is not part of the latency of the pipeline, the packed and sealed data can be written to RAID, i.e., there's no need to buffer the compressed and packed data into NVRAM. Meanwhile, at 206-231 the process proceeds on the next batch, and so on and so forth.

The embodiment illustrated in FIG. 2 allows for timely response to the protocol layer and independence on compression latency, as the protocol layer doesn't have to be waiting for the compression to complete. The result is a shorter overall latency of the de-dup pipeline and the freedom to select any compression algorithm without adversely affecting the pipeline.

The embodiment of FIG. 2 results in a method for processing deduplication backup operation, comprising: receiving user data for backup; processing protocol of the user data; performing deduplication filtering to identify duplication in the data; when the filtering identifies non-duplicated data to be stored, buffering the non-duplicated data; upon completion of buffering, notifying protocol layer of completion and receiving next user data for backup; and, in parallel with receiving next user data, compressing the non-duplicated data to be stored.

FIG. 3 illustrates the improvement gained in overall pipeline latency by employing the enhanced pipeline embodiment of FIG. 2 over the standard traditional pipeline of FIG. 1. The improvement on overall pipeline latency can be expressed by:

Improvement=compression latency+pack latency+ NVRAM latency−Pmem latency.

Since the persistent memory latency is extremely short compared to the compression latency, the resulting improvement is significant, especially with the implementation of direct access. As an example, using DellEMC DD9900 compression and NVDIMM (a prominent form of persistent memory), a 100 KB data compression in de-dup pipeline takes up around 200~300 μs while 100 KB NVIDMM writing can finish within 1 μs. Therefore, removing the compression latency from the overall de-dup pipeline latency dramatically shortens the overall de-dup pipeline latency and enables serving additional clients.

Figure 4:
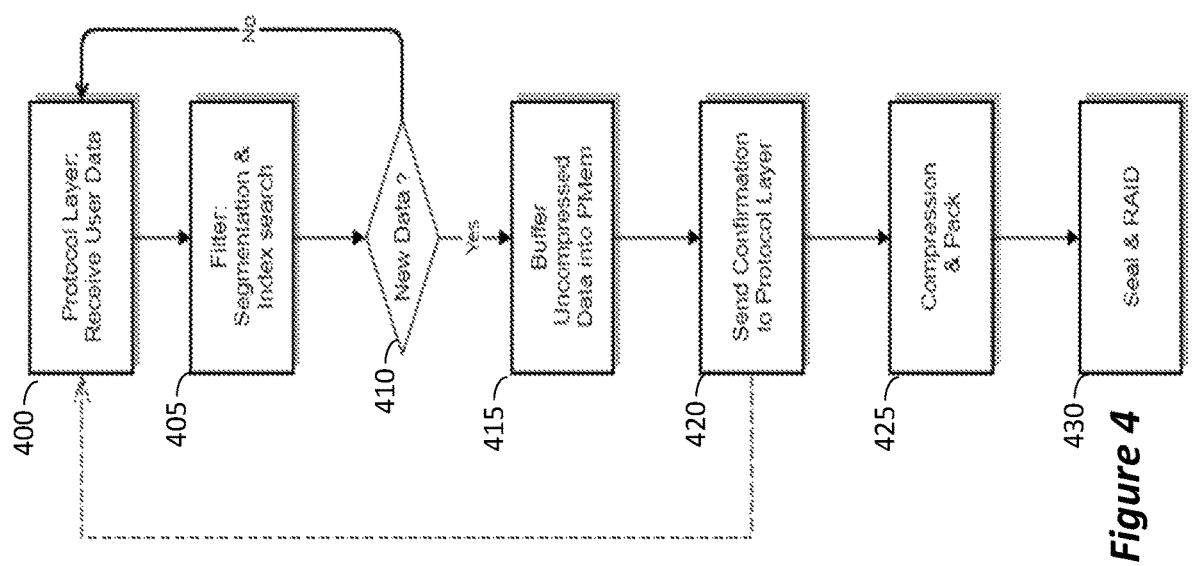
FIG. 4 is a flow chart illustrating the process according to an embodiment of the deduplication pipeline.

FIG. 4 is a flow chart illustrating the recursive process according to an embodiment of the inventive de-dup pipeline. At 400 the protocol layer receives user data for de-dup and storage. At 405 the CPU performs the de-dup filtering by segmentation and index search in the conventional manner. This operation is standard de-dup process for finding duplicated data and will not be fully described herein. At 410 it is checked whether the filtering operation resulted in new, i.e., non-duplicative, data to be sent to storage. If not, the process reverts to 400 to accept new user data. If at 410 it is determined that the filtering process resulted in new data to be stored, at 415 the data is buffered in its uncompressed format into the persistent memory. Then at 420 confirmation is sent to the protocol layer, so that the protocol layer can process the next user data. Meanwhile at 425 the process proceeds to compress and pack the data that is buffered in the persistent memory and in 430 seals the compressed data and stores it in the RAID. In this example, the compression is performed by the co-processor/QAT, so that the CPU is free to operate on the next pipeline.

In the disclosed embodiments the data is buffered in uncompressed form, which places additional requirement on the persistent memory in terms of capacity and performance, i.e., speed. First, since the persistent memory will be used to buffer un-compressed data, larger capacity or buffer size is required. According to one compression example the amount of uncompressed data is about 2.6 times as much as that of the compressed data. Thus, the size of persistent memory needs to be at least 2.6 times larger than the size of the NVRAM in the standard pipeline. Second, since the amount of data to buffer is larger, wiring speed must increase proportionately. Consequently, disclosed embodiments use persistent memory, such as, e.g., Intel® Optane™, for the buffering layer, which provides the increased capacity. Additionally, disclosed embodiments use the direct access feature of the persistent memory to increase writing performance.

Figure 5:
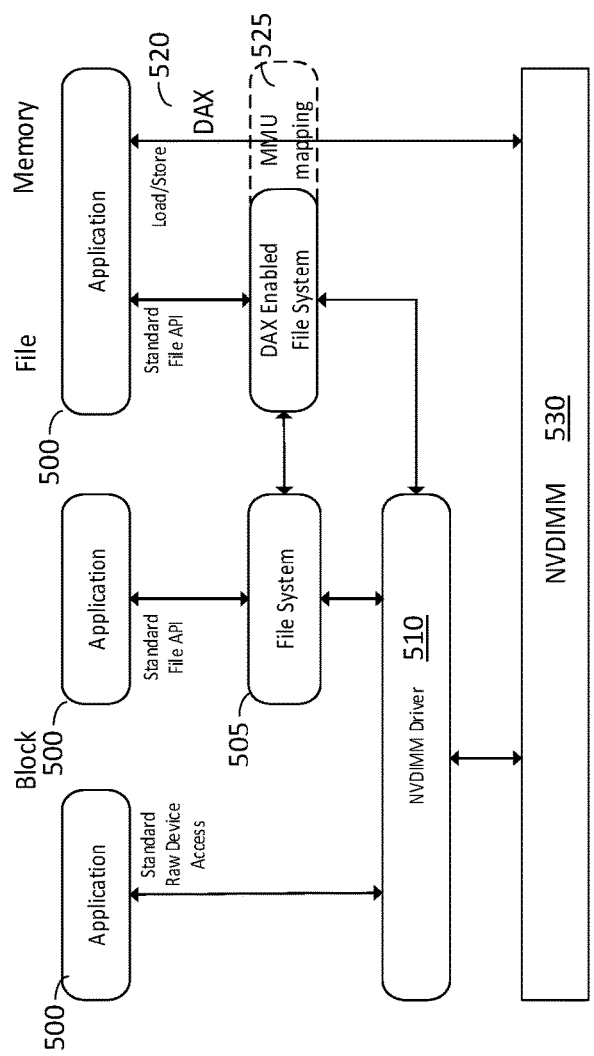
FIG. 5 is a schematic illustrating a software stack for a persistent memory according to an embodiment.

FIG. 5 illustrates a high-throughput low-latency implementation of persistent memory in the de-dup pipeline, according to an embodiment. The persistent memory device is resided on memory DIMM slot 530. It has DRAM-like latency and bandwidth since it is directly on the memory bus. As illustrated in FIG. 5, the software stack of the persistent memory provides block and direct access (DAX) modes to improve bandwidth and latency. By using DAX 520 for the write operations of the uncompressed data, rather using standard API calls, the write latency is drastically shortened, as DAX mode is a mmap-based feature 525 that is the fastest access mode. Therefore, writing is done directly to memory, rather than using block page cache.

Using block access mode, the application 500 operates via standard API stack and process the write operation using the file system 505 and disk driver 510. Using the file system 505 in the stack the page cache is used to buffer writes to files, thus requiring an extra copy operation. Conversely, in direct access mode 525 the application writes directly to the memory bypassing the stack. This removes the page cache copy operation.

By employing persistent memory in the de-dup pipeline, the buffer size and performance limitations of the standard NVRAM are avoided—persistent memory allow for more data to be buffered and at a higher speed. By reordering the pipeline, the protocol layer can proceed to the next data input once the uncompressed data has been buffered into persistent memory, without waiting for the completion of compression. Therefore, compression latency is not associated with the overall pipeline latency. As a result, compression algorithms that have higher compression ratio, but also higher latency become viable to use. The resulting overall pipeline latency is drastically reduced, while co-processor, e.g., QAT, is available to perform high ratio compression in asynchronous mode. Also, by using persistent memory and employing DAX for uncompressed data buffering, the persistent memory can be fully utilized for both its capacity advantage and its performance advantage over standard NVRAM.

The embodiments disclosed herein provide a system for deduplicating user data for storage, comprising: a processor executing a protocol layer and a filter layer; a persistent memory residing on memory bus and buffering uncompressed data from the filter layer; a co-processor executing compression on uncompressed data stored in the persistent memory; and a storage device storing compressed data from the co-processor.

The disclosed embodiments also enable a computer program product comprising a non-transitory computer-readable medium having a computer-readable program code embodied therein to be executed by one or more processors and one or more co-processors coupled to a persistent memory residing on memory bus, the program code including instructions to: receive user data for backup; operate the processor to process protocol of the user data; operate the processor to perform deduplication filtering to identify duplication in the user data; operating the persistent memory to buffer non-duplicated data obtained from the deduplication filtering; upon completion of buffering, notifying protocol layer of completion and receive next user data for backup; and, operating the co-processor asynchronously to compress the non-duplicated data to be stored.

Disclosed embodiments further include a pipeline for processing data to be stored for backup, the pipeline receiving a plurality of data sets for storage and recursively performing the ordered steps comprising: receiving a first data set and processing protocol of the first data set; executing deduplication operation on the first data set to identify non-duplicative data within the first data set; buffering the non-duplicative data in persistent memory using direct aces write operation; notifying protocol layer that buffering has completed and, in parallel proceeding to: receive next data set for processing and compressing the non-duplicative data stored in the persistent memory and sending compressed data to storage device.

In the context of this disclosure, persistent memory (PMEM) refers to a solid-state high-performance byte-addressable memory device that resides on the memory bus. Example of such a device is Intel® Optane™, available from Intel® of Santa Clara, Calif. Being on the memory bus allows PMEM to have DRAM-like access to data, which means that it has nearly the same speed and latency of DRAM and the nonvolatility of NAND flash. In the context of this disclosure, PCIe refers to peripheral component interconnect express, which is an interface standard for connecting high-speed components. In the context of this disclosure, references to co-processor include device accelerators such as QAT (QuickAssist Technology), available from Intel® of Santa Clara, Calif. In the context of this disclosure, Nonvolatile random-access memory (NVRAM) is a random-access memory that resides on the PCIe bus and retains its information even if there is no power. In the context of this disclosure, direct access (DAX) referred to bypassing the page cache by performing reads and writes directly to the storage device.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified. Reference to ordinal numbers such as "first," "second," "third," etc. may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A method for processing deduplication backup operations, comprising:
   receiving, by a processor, user data for backup;
   processing, by the processor, protocol of the user data;
   performing, by the processor, deduplication filtering to identify duplication in the data;
   when the filtering identifies non-duplicated data to be stored, buffering the non-duplicated data in uncompressed format in a persistent memory (PMEM);
   upon completion of buffering the non-duplicated data in the uncompressed format in the PMEM, sending, by the processor, a confirmation to a protocol layer to notify the protocol layer to process next user data; and receiving, by the processor, the next user data for backup; and, while processing, by the processor, protocol and filtering of the next user data, compressing, by a co-processor, the non-duplicated data to be stored.

2. The method of claim 1, wherein buffering the non-duplicated data comprises storing the non-duplicated data in the uncompressed format.

3. The method of claim 2, wherein buffering the non-duplicated data comprises storing the non-duplicated data in the persistent memory (PMEM).

4. The method of claim 3, wherein storing the non-duplicated data in the persistent memory comprises writing the data using direct access.

5. The method of claim 1, wherein compressing the non-duplicated data comprises using the co-processor to perform the compression.

6. The method of claim 5, further comprising storing compressed data output by the co-processor in a disk array.

7. The method of claim 6, further comprising prior to storing the compressed data, packing and sealing the compressed data.

8. A system for deduplicating user data for storage, comprising:
   a processor executing a protocol layer and a filter layer;
   a persistent memory (PMEM) residing on memory bus and buffering uncompressed data from the filter layer in uncompressed format in the PMEM;
   upon completion of buffering the non-duplicated data in the uncompressed format in the PMEM, the processor sending a confirmation to the protocol layer to notify the protocol layer to process next user data;
   receiving the next user data for backup; and,
   while the processor processing protocol and filtering of the next user data, a co-processor compressing the non-duplicated data to be stored;
   a storage device storing compressed data from the co-processor.

9. The system of claim 8, wherein the co-processor compresses the uncompressed data asynchronously to the processor executing the protocol layer and the filter layer.

10. The system of claim 9, wherein the co-processor comprises QuickAssist Technology.

11. The system of claim 10, wherein the persistent memory buffers uncompressed data using direct access.

12. The system of claim 11, wherein the uncompressed data from the filter layer comprises non-duplicated data.

13. The system of claim 12, wherein the storage device comprises redundant array of independent disks (RAID).

14. The system of claim 13, further comprising a packing layer organizing the compressed data for storage in the RAID.

15. A computer program product comprising a non-transitory computer-readable medium having a computer-readable program code embodied therein to be executed by one or more processors and one or more co-processors coupled to a persistent memory residing on memory bus, the program code including instructions to:
   receive, by a processor, user data for backup;
   operate the processor to process protocol of the user data;
   operate the processor to perform deduplication filtering to identify duplication in the user data;
   operate the persistent memory to buffer non-duplicated data obtained from the deduplication filtering in uncompressed format in a persistent memory (PMEM);
   upon completion of buffering the non-duplicated data in the uncompressed format in the PMEM, operate the processor to send a confirmation to a protocol layer to notify the protocol layer to process next user data; and
   receive, by the processor, the next user data for backup; and,
   while processing, by the processor, protocol and filtering of the next user data, compress, by a co-processor, the non-duplicated data to be stored.

16. The computer program product of claim 15, wherein the program code includes further instructions to buffer the non-duplicated data using direct access (DAX) mode.

17. The computer program product of claim 16, wherein the program code includes further instructions to store the compressed data in a storage device.

18. The computer program product of claim 17, wherein the storage device comprises redundant array of independent disks (RAID) and the program code includes further instructions to pack the compressed data for storage in the RAID.

19. A computer-implemented method for deduplicating user data for storage, comprising performing operations, the operations comprising:
   receiving, by a processor, a first transmission of user data for backup;
   extracting, by the processor, from the first transmission of user data non-duplicative data;
   buffering the non-duplicative data in uncompressed format in a persistent memory (PMEM);
   upon completing buffering the non-duplicative data in the uncompressed format in the PMEM, sending, by the processor, a confirmation to a protocol layer to notify the protocol layer to process next user data, and
   receiving, by the processor, the next user data for backup; and,
   while processing, by the processor, protocol and filtering of the next user data, compressing, by a co-processor, the non-duplicated data to be stored.

20. The computer-implemented method of claim 19, wherein the buffering is executed by direct write mode into persistent memory and the compressing is executed by the co-processor.

* * * * *